United States Patent
Beaudoin et al.

(10) Patent No.: US 8,968,152 B2
(45) Date of Patent: Mar. 3, 2015

(54) TRANSMISSION ARRANGEMENT COMPRISING A POWER MIXING MECHANISM

(75) Inventors: Samuel Beaudoin, Yamaska (CA); Jean-Robert Desmeules, Trois-Rivières (CA)

(73) Assignee: Transmission CVTCORP Inc., Ste-Julie, Quebec (CA)

( * ) Notice: Subject to any disclaimer, the term of this patent is extended or adjusted under 35 U.S.C. 154(b) by 169 days.

(21) Appl. No.: 13/581,943

(22) PCT Filed: Mar. 7, 2011

(86) PCT No.: PCT/CA2011/000241
§ 371 (c)(1),
(2), (4) Date: Nov. 19, 2012

(87) PCT Pub. No.: WO2011/109891
PCT Pub. Date: Sep. 15, 2011

(65) Prior Publication Data
US 2013/0106367 A1    May 2, 2013

Related U.S. Application Data

(60) Provisional application No. 61/311,515, filed on Mar. 8, 2010.

(51) Int. Cl.
*B60W 10/02*    (2006.01)
*B60W 20/00*    (2006.01)
*F16H 37/02*    (2006.01)

(52) U.S. Cl.
USPC .............................. 477/41; 475/208; 475/209

(58) Field of Classification Search
USPC ........ 477/41, 42, 43; 475/339, 340, 208, 209, 475/218
See application file for complete search history.

(56) References Cited

U.S. PATENT DOCUMENTS

| | | | |
|---|---|---|---|
| 4,628,766 A | 12/1986 | De Brie Perry | |
| 5,971,887 A * | 10/1999 | Hattori et al. | 477/41 |
| 6,605,016 B2 * | 8/2003 | Miyata et al. | 475/216 |
| 6,719,659 B2 | 4/2004 | Geiberger et al. | |
| 2001/0003108 A1 * | 6/2001 | Goi et al. | 475/208 |

(Continued)

FOREIGN PATENT DOCUMENTS

| | | |
|---|---|---|
| EP | 1106870 | 6/2001 |
| GB | 2100372 | 12/1982 |

(Continued)

OTHER PUBLICATIONS

US 4,528,766, 12/1986, De Brie Perry (withdrawn).
PCT International Search Report and Written Opinion of International Searching Authority for International Patent Application No. PCT/CA2011/000241, mailed Jul. 5, 2011, 12 pages.

*Primary Examiner* — Roger Pang
(74) *Attorney, Agent, or Firm* — K&L Gates LLP

(57) ABSTRACT

A transmission arrangement for transmitting power from a power source to an electrical generator. The transmission arrangement comprises a continuously variable transmission (CVT) and an alternative transmission that is more efficient at transmitting power than the CVT. The transmission arrangement further comprises a power mixing mechanism for combining power from the CVT and the alternative transmission into a combined power output to be provided to the electrical generator. The percentage of CVT power within the combined power output decreases as the power supplied by the power source increases.

19 Claims, 6 Drawing Sheets

(56) References Cited

U.S. PATENT DOCUMENTS

| | | | |
|---|---|---|---|
| 2001/0041640 A1* | 11/2001 | Sakai et al. | 475/207 |
| 2006/0142110 A1* | 6/2006 | Greenwood et al. | 475/214 |
| 2008/0194372 A1* | 8/2008 | Glockler | 475/210 |
| 2009/0023545 A1* | 1/2009 | Beaudoin | 476/42 |
| 2009/0105041 A1 | 4/2009 | McKenzie et al. | |
| 2009/0143192 A1* | 6/2009 | Fuchs et al. | 477/43 |

FOREIGN PATENT DOCUMENTS

| | | |
|---|---|---|
| GB | 2418235 | 3/2006 |
| WO | 2006034582 | 4/2006 |
| WO | 2009065055 | 5/2009 |

\* cited by examiner

| Engine Speed RPM | CVT Ratio | Total Transmission Ratio | Transmission Efficiency % |
|---|---|---|---|
| 1100 | 0,45 | 0,61 | 93,5 |
| 1210 | 0,52 | 0,67 | 93,9 |
| 1320 | 0,61 | 0,73 | 94,2 |
| 1430 | 0,71 | 0,79 | 94,6 |
| 1540 | 0,82 | 0,86 | 95,0 |
| 1650 | 0,96 | 0,92 | 95,4 |
| 1760 | 1,12 | 0,98 | 95,7 |
| 1870 | 1,31 | 1,04 | 96,1 |
| 1980 | 1,55 | 1,1 | 96,5 |
| 2090 | 1,85 | 1,16 | 96,9 |
| 2200 | 2,24 | 1,22 | 97,3 | under the US 8,968,152 B2

TRANSMISSION ARRANGEMENT COMPRISING A POWER MIXING MECHANISM

CROSS REFERENCE TO RELATED APPLICATIONS

This is a national phase under 35 U.S.C. §371 of International Application No. PCT/CA2011/000241, filed on Mar. 7, 2011, which claims priority to and the benefit of U.S. Provisional Patent Application No. 61/311,515, filed on Mar. 8, 2010, the entire disclosures of each of which are incorporated by reference herein.

FIELD

The present invention relates generally to the field of transmission arrangements, and more particularly to a method and system for transmitting combined power from a Continuously Variable Transmission (CVT) and an alternative transmission to a load.

BACKGROUND

CVTs are well known in the art, depending on the CVT technology used, efficiencies ranging between about 65% and about 93% can be expected.

In some applications, these efficiencies are acceptable. However, in other applications, such as for example, power generation, efficiencies as high as possible are desirable.

Against this background, it can be seen that there is a need in the industry to provide a more efficient transmission arrangement that offers the benefits of a CVT, while reducing at least some of the deficiencies presented by existing CVTs.

It is to be expressly understood that the description and drawings are only for the purpose of illustration of certain embodiments and are an aid for understanding

DETAILED DESCRIPTION

In accordance with an illustrative embodiment of the present invention, there is provided a transmission arrangement for transmitting power from a power source to an output shaft, the transmission arrangement comprising:

a continuously variable transmission (CVT) so configured as to receive power from the power source and to provide a CVT power output;

an alternative transmission so configured as to receive power from the power source and to provide an alternative transmission power output; and a power mixing mechanism so configured as to combine the CVT power output and the alternative transmission power output into a combined power output to be supplied to the output shaft, wherein a percentage of CVT power within the combined power output decreases as power supplied by the power source increases.

According to another aspect, there is provided a method for providing power from a power source to a power output shaft, the method comprising:

receiving at a power mixing mechanism, a continuously variable transmission (CVT) power output;

receiving at the power mixing mechanism, an alternative transmission power output;

combining, at the power mixing mechanism, the CVT power output and the alternative transmission power output into a combined power output to be provided to the power output shaft, wherein a percentage of alternative transmission power within the combined power output varies in response to a change in load demand at the power output shaft.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

Other objects, advantages and features of the present invention will become more apparent upon reading of the following non-restrictive description of illustrative embodiments thereof, given by way of example only with reference to the accompanying drawings.

Figure 1:
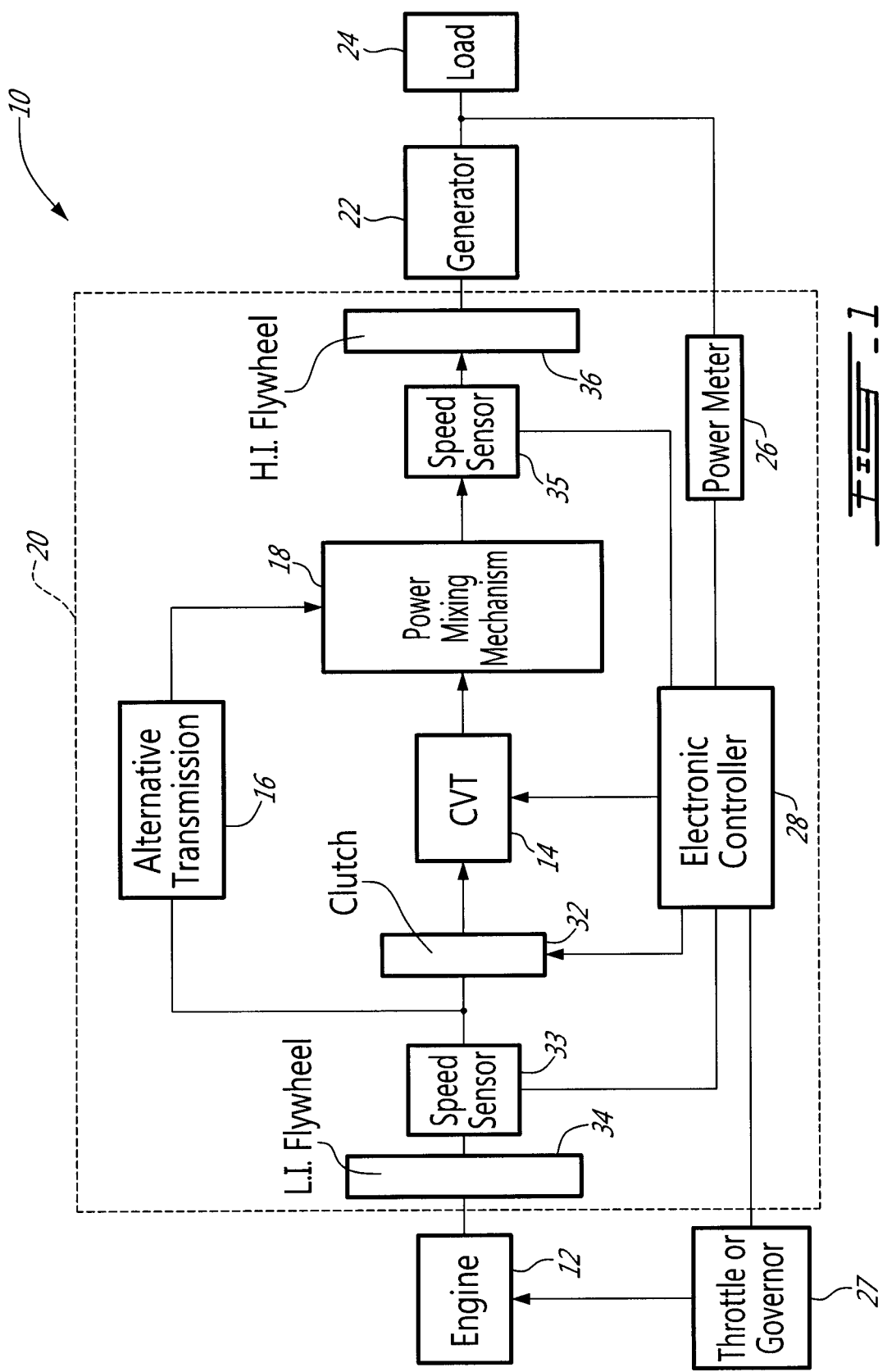
FIG. 1 shows a block diagram of an electrical generator arrangement in accordance with a non-limiting example.

Shown in FIG. 1 is a non-limiting block diagram of an electrical generator arrangement 10 including a transmission arrangement according to an illustrative embodiment. The electrical generator arrangement 10 comprises a prime mover in the form of an internal combustion engine 12, a transmission arrangement 20 and a generator 22 to which can be applied a load 24.

In general, the load 24 that is applied to the generator 22 is powered by alternating current that is provided at a substantially constant frequency (generally 60 Hz or 50 Hz). In order to be able to supply alternating current to the load 24 at a substantially constant frequency, the generator 22 should be driven at a substantially constant rotation speed (for example, 1800 rpm for 60 Hz and 1500 rpm for 50 Hz). If the alternating current is not provided at a substantially constant frequency, an electronic frequency converter must be used between the generator 22 and the load 24 to regulate the electrical wave frequency.

In order to avoid using a frequency converter, most existing generators are powered by a diesel engine that is driven at a constant speed. However, when load demands vary, engines do not run efficiently at a constant speed. For optimal efficiently, an internal combustion engine should deliver a given power at a specific speed (output mechanical power/input fuel power). Therefore in order to operate efficiently, it is desirable to control, increase or decrease, the rotational speed of the engine 12 in response to changes in the load demand at the electrical generator 22. If not, by operating the engine 12 at constant speed when the load demand varies, the engine runs inefficiently in terms of fuel costs, increased emission of pollutants and higher noise levels.

Figure 2:
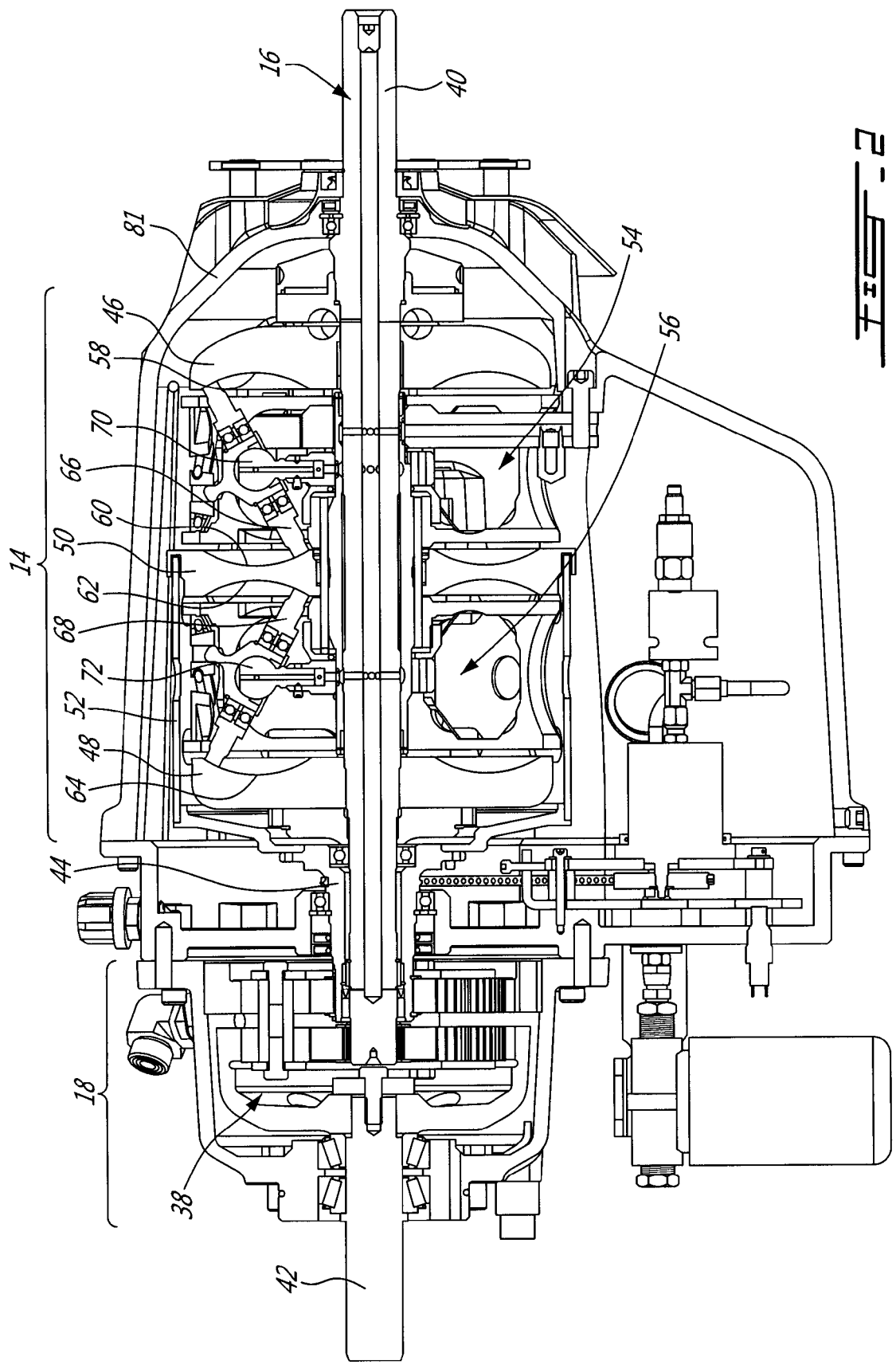
FIG. 2 shows a cross sectional diagram of a transmission arrangement that comprises a continuously variable transmission and a power mixing mechanism.

In accordance with an illustrative embodiment, in order to allow the engine 12 to run more efficiently during varying load requirements, a transmission arrangement 20 that includes a Continuously Variable Transmission (CVT) 14 is positioned between the controllable variable output of the engine 12 and the input of the generator 22. The CVT 14 is for example a dual cavity toroidal CVT, a non-limiting example of which is shown in FIG. 2. The CVT 14 is able to convert the controllable variable output of the engine 12 into a constant speed, at an output shaft thereof, which is associated with the generator 22.

The manner in which the CVT 14 is able to regulate the input speed at the generator 22 will now be described in more detail with respect to FIGS. 1 and 2.

As shown in FIG. 1, the electrical generator arrangement 10 comprises an electronic controller 28 that is in communication with a power meter 26, the engine 12 and the CVT 14. The power meter 26 is positioned in communication with the output of the generator 22, such that the power meter 26 is able to obtain readings of the power demand on the electrical generator 22 by the load 24.

The electronic controller 28 may further be in communication with an input speed sensor 33 that obtains readings indicative of the rotation speed at the input to the CVT 14 (which is also the rotation speed of the engine 12), and an output speed sensor 35 that obtains readings indicative of the rotation speed at the output of the transmission arrangement 20 (which is also the input speed to the generator 22). It is to be noted that the output speed of the transmission can also be obtained by monitoring the frequency of the electrical output of the generator 22. These readings are provided to the electronic controller 28 such that, at least in part on the basis of these readings, the electronic controller 28 is able to:

control the throttle 27 of the engine 12 in order to increase/decrease the fuel rate supply to the engine and thus control the speed and/or power of the engine 12, or in the case of an electronically controlled engine, issue a control signal to the engine controller indicative of the desired rotational speed; and control the transmission ratio of the CVT 14 in order to maintain a constant speed at the generator 22, despite a change in the speed and/or power at the engine 12.

Accordingly, by controlling the variable output of the prime mover and the transmission ration of the CVT, it is possible to improve the overall efficiency of the transmission in various load conditions.

A non-limiting manner in which the electronic controller 28 is able to control these two components of the electrical generator arrangement 10, is described in more detail in PCT Application PCT/CA2005/001479, published on Apr. 6, 2006, which is incorporated herein by reference in its entirety.

Shown in FIG. 2, is a non-limiting illustrative embodiment of the transmission arrangement 20. The transmission arrangement 20 comprises a CVT 14, an alternative transmission 16 and a power mixing mechanism 18. In the non-limiting embodiment shown, the alternative transmission 16 comprises the input shaft 40 of the CVT 14. As such, the alternative transmission 16 is a straight drive shaft that is part of the CVT 14 transmission. In FIG. 1, the alternative transmission 16 is shown as being separate from the CVT 14 since it is able to transmit power independently of the CVT 14 transmission. However, it should be understood that in accordance with the non-limiting illustrative embodiment described herein, the alternative transmission 16 is the central shaft 40 of the CVT.

The power mixing mechanism 18 comprises a planetary gear assembly 38 that is able to combine the power from the CVT 14 and from the alternative transmission 16 into a combined output power, as will be described in more detail below.

The input shaft 40 of the CVT 14 is connected to the engine 12 for receiving an input rotation speed from the engine 12. It should be appreciated that the engine 12 may be any type of prime mover, such as a diesel engine or gasoline internal combustion engine, among other possibilities. The CVT 14 that is shown in FIG. 2 comprises a pair of toroidal discs 46 and 48 that are fixedly connected to the input shaft 40 and a double-sided output toroidal disc 50 that is fixedly connected, via a cage-like structure 52, to a CVT output shaft 44. In the non-limiting illustrative embodiment shown, both the input shaft 40 and the CVT output shaft 44 are co-axial.

A first toroidal cavity 54 is created between the input toroidal disc 46 and the output toroidal disc 50, and a second toroidal cavity 56 is created between the input toroidal disc 48 and the output toroidal disc 50. The first toroidal cavity 54 defines toroidal races 58, 60 and the second toroidal cavity 56 defines toroidal races 62, 64. Three friction rollers 66 (only one shown) are positioned within the first toroidal cavity 54 such that they are in engagement with both races 58 and 60, and three friction rollers 68 (only one shown) are positioned within the second toroidal cavity 56 such that they are in engagement with the races 62, 64. It should, however, be appreciated that any number of frictional rollers 66, 68 could be included within the toroidal cavities.

The rollers 66 and 68 are rotatably mounted on axial carriers 70, 72 respectively, such that they can rotate to transfer rotational motion between the outer toroidal discs 46, 48 and the output toroidal disc 50. In this manner, the input toroidal discs 46, 48 are the driving discs, and the output toroidal disc 50 is the driven disc. In operation, the CVT transmission ratio is varied by tilting the friction rollers 66, 68 such that the friction rollers 66, 68 contact the races 58, 60 and 62, 64 at different contact points on the toroidal surfaces. As indicated above, the manner in which the CVT transmission ratio is varied is described in more detail in PCT Application PCT/CA2005/001479, which was published on Apr. 6, 2006.

One skilled in the art will understand that the CVT 14 could also be used with disk 50 as a power input and disks 46 and 48 as power output.

Both the CVT output shaft 44 and the input shaft 40 (which is also part of the alternative transmission 16) provide transmission power to the planetary gear assembly 38 of the power mixing mechanism 18. The planetary gear assembly 38 combines the power from the CVT 14 and the power from the alternative transmission 16 into a combined output power that is provided to the generator 22 via the output shaft 42.

It is the output shaft 42 of the transmission arrangement 20 that is operative for providing a stable rotation speed to the electrical generator 22. Changes in rotation speed of the output shaft 42 will cause a change in the input rotation speed to the generator 22, which directly affects the frequency of the output electrical wave in the same proportion. Output voltage may also be affected by fluctuations in the input speed of the generator 22. Generally, stated, very limited variations of electrical wave parameters can be tolerated from a generator system, especially when intended to supply an electrical network in the case of a power failure. Therefore the system should be stable and feature a high level of immunity to load demand fluctuations.

In general, toroidal CVTs are quite durable, and as such can withstand the heavy use that is often associated with electrical generator arrangements 10. In addition, the mechanical nature of the toroidal CVT 14 provides a relatively fast response time in comparison to other types of CVTs. However, a deficiency with toroidal CVTs 14 is that they can generate frictional losses in the power transmission due to the friction between the rollers and the rotating discs. While the efficiency of toroidal CVTs is generally quite good, when they are used with power generators the frictional losses can result in increased fuel requirements for the power source, which can become quite costly.

In order to improve the overall efficiency of the power transmission between the engine 12 and the generator 22, as described above, the transmission arrangement 20 according to the present invention comprises the alternative transmission 16 in addition to the CVT 14. The alternative transmission 16 is any transmission that is more efficient than the CVT 14, such as a simple drive shaft, among other possibilities. The power mixing mechanism 18 is operative for combining the power from the CVT 14 and from the alternative transmission 16 into a combined power that is supplied to the generator 22.

As will be explained in more detail throughout the present application, by mixing the power from the more efficient alternative transmission 16 with the power from the less efficient CVT 14, the transmission arrangement 20 is able to provide more efficient power transmission than would be possible by using the CVT 14 alone.

More specifically, in situations where the engine 12 is running at a lower speed and providing relatively little power, such as when the load 24 that is applied to the generator 22 is relatively low, the power mixing mechanism 18 causes a greater percentage of power to be provided to the generator 22 from the CVT 14. In contrast, when the engine 12 is running at a higher speed and providing greater power, such as when there is a large load 24 that is applied to the generator 22, the power mixing mechanism 18 causes a greater percentage of power to be provided to the generator 22 from the alternative transmission 16.

One skilled in the art will also understand that for certain application where it is desirable to maximize the efficiency of the transmission at low load, the power mixing system could be configured so that maximum proportion of power flows in the alternative transmission at low power demand while having greater proportion of power flowing in the CVT during high power demand.

As such, as the power generated by the engine 12 increases, the percentage of power being provided to the generator 22 by the CVT 14 decreases. In this manner, when greater power is being generated by the engine 12 (which is generally more costly in terms of fuel consumption), more of that power is transmitted to the generator 22 via the more efficient alternative transmission 16. Generally stated, the greater the percentage of output power transiting through the alternative transmission 16, the greater the overall efficiency of the transmission arrangement 20.

It is the combination of the power mixing mechanism 18 ratio and the CVT 14 ratio that causes the percentage of power from the CVT 14 and the alternative transmission 16 to vary in response to a change in the load demand on the generator 22. More specifically, a change in load demand on the generator 22 will cause the CVT 14 to change its transmission ratio thus forcing the engine to adjust its rotation speed to maintain relatively stable speed at the generator 22. The change in CVT transmission ratio together with the configuration of the gears within the power mixing mechanism 18 will cause an adjustment in the power split from the CVT 14 and the alternative transmission 16.

Figure 3:
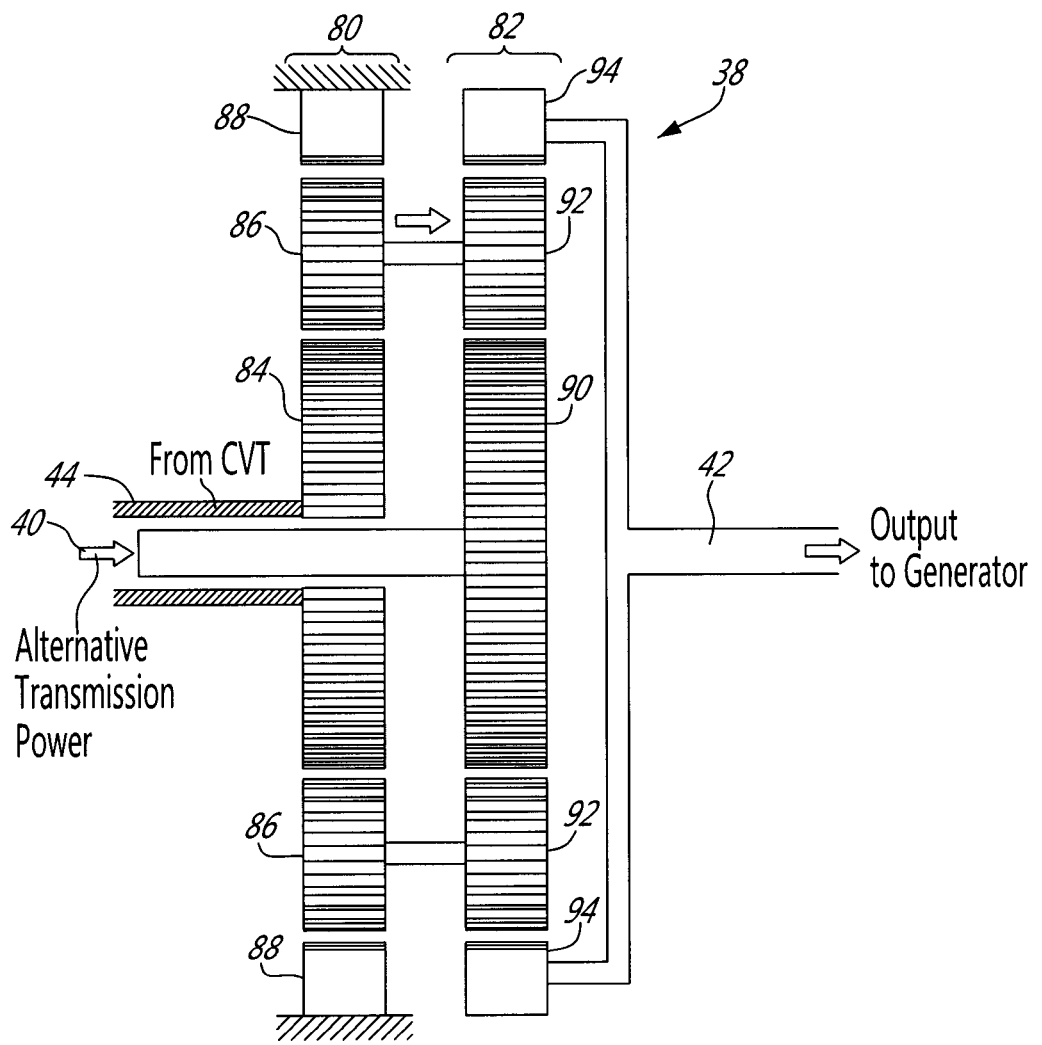
FIG. 3 shows an expanded side view of the power mixing mechanism of FIG. 2.

Shown in FIG. 3, is a schematic expanded view of the power mixing mechanism 18 according to an illustrative embodiment. As shown, the power mixing mechanism 18 comprises a planetary gear assembly 38 that comprises a first planetary gear train 80 that functions as a speed adjusting planetary gear train, and a second planetary gear train 82 that functions as the mixing planetary gear train.

As shown, the first planetary gear train 80 includes a sun gear 84, planet gears 86 and a ring gear 88 that is fixed to the housing 81 of the transmission arrangement 20. The CVT output shaft 44 is fixedly connected to the sun gear 84, such that the rotation speed and power from the CVT output shaft 44 is imparted to the sun gear 84. Rotation from the sun gear 84 is imparted to the planet gears 86, which rotate between the sun gear 84 and the ring gear 88. As mentioned above, the ring gear 88 is fixed to the housing 81 of the transmission arrangement 20, such that the ring gear 88 does not rotate.

In the first planetary gear train 80, the sun gear 84 acts as the input and the planet carrier (not shown) connected to the planet gears 86 acts as the output. The gear ratio for such an arrangement can be calculated by the formula (1+teeth of Ring Gear/teeth of Sun Gear). In accordance with a non-limiting illustrative embodiment, the first planetary gear train 80 has a gear ratio of 3.53. Such an arrangement can be used in order to adjust the speed between the output of the CVT 14 and the input of the mixing planetary gear train 82.

The second planetary gear train 82 comprises a sun gear 90, planet gears 92 and a ring gear 94. The alternative transmission 16 is connected to the sun gear 90, such that the rotation speed and power of the input shaft 40 is imparted to the sun gear 90. In addition, the planet carrier (not shown) of the planet gears 86 of the first planetary gear train 80 imparts its rotation speed and power to the planet carrier (not shown) of the planet gears 92 of the second planetary gear train 82 since the respective planet carriers of the first and second planetary gear trains 80 and 82 are interconnected.

In this manner, the second planetary gear train 82 comprises two inputs; namely the input of the alternative transmission 16 via the sun gear 90 and the input from the CVT 14 via the planet gears 92. The input from the sun gear 90 and the input from the planet carrier of the planet gears 92 act together to impart rotation and a mix of power from the CVT 14 and the alternative transmission 16 to the ring gear 94. In this manner, power from both the CVT 14 and the alternative transmission 16 is provided to the ring gear 94, which imparts rotation to the output shaft 42 of the transmission arrangement 20. It is the rotation speed of the output shaft 42 that is provided to the generator 22 and that should be maintained relatively constant in order to maintain the 50 Hz or 60 Hz frequency.

In accordance with a non-limiting embodiment, the second planetary gear train 82 has a planetary gear ratio of 1.63. In operation, the rotation speed of the ring gear 94 can be calculated using the following formula:

$$\omega r = (\omega c^*(1+R) - \omega s)/R$$

Where:
$\omega r$ = the rotation speed of the planetary ring gear;
$\omega c$ = the rotation speed of the planetary carrier;
$\omega s$ = the rotation speed of the sun gear; and
R = the planetary gear ratio.

The planetary gear assembly 38 shown in FIG. 3 comprises two degrees of freedom, meaning that it is able to receive two independent input powers; namely a first input power from the CVT 14 and a second input power from the alternative transmission 16. Based on these two input powers, the mixed output power will be governed by the relationship between the gears.

In the illustrative embodiment described with respect to FIG. 3, the CVT 14 provides an input power to the sun gear 84 and the alternative transmission 16 provides an input power to the sun gear 90. The combined output power is then provided to the output shaft 42 via the ring gear 94. So long as the planetary gear assembly 38 provides two degrees of freedom (i.e. can receive two different input powers that can be combined into a single output power), the input power from the two sources can be provided to different ones of the gears and the output power can be received from a different one of the gears, while still obtaining the same performance from the planetary gear assembly 38. More specifically, this is true so long as the direction of the input speeds and torques creates a combination of power to the output, as opposed to a recirculation of the power between the two inputs. The manner in which the two-degree of freedom gear assembly 38 can be configured in order to obtain the desired performance will be known to a person of skill in the art, and as such will not be described in more detail herein.

One skilled in the art will also understand that some configurations where power is recirculating could also present the same desirable effect of limiting the power flowing in the CVT and maximizing the power in the alternative transmission thus resulting in a higher overall transmission efficiency.

As mentioned above, the planetary gear assembly schematically shown in FIG. 3 is configured such that it provides a combined output power to the output shaft 42 that includes a mix of power from the CVT 14 and from the alternative transmission 16. The combined output power comprises a first percentage of power from the CVT 14, and a second percentage of power from the alternative transmission 16. Not taking into account the losses, the sum of the first percentage and the second percentage gives 100% of the combined output power.

The percentage of power from the CVT 14 and the percentage of power from the alternative transmission 16 that make up the combined output power are not fixed. Instead, the power mixing mechanism 18 causes these percentages (i.e. the power split) to vary depending on the transmission ratio of the CVT 14. As the transmission ratio of the CVT 14 changes, the percentage of the output power provided by the CVT 14 and the percentage of the output power provided by the alternative transmission 16 is governed by the combination of the CVT transmission ratio and the gear ratios within the planetary gear assembly 38 of the power mixing mechanism 18.

Figure 4:
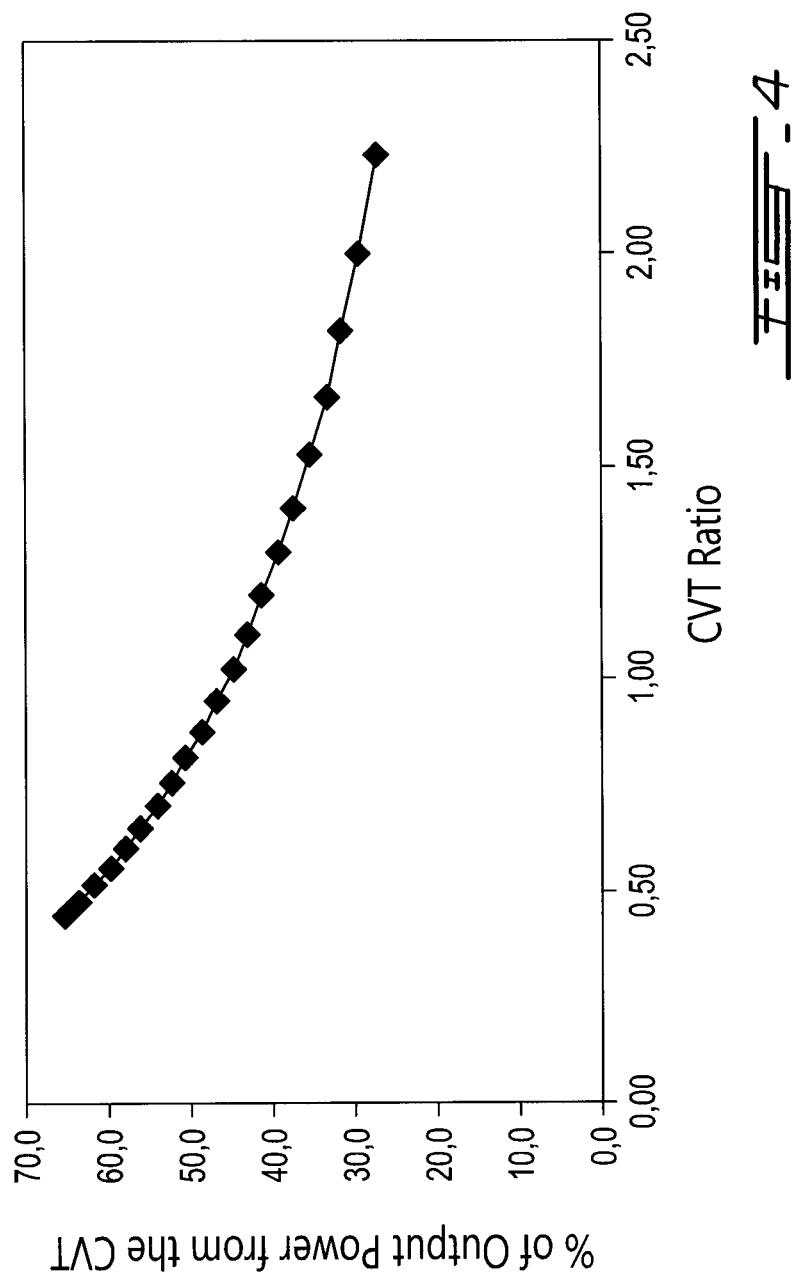
FIG. 4 shows a graph of the percentage of output power provided by a CVT vs. the transmission ratio of the CVT, according to a non-limiting example.

In the present illustrative embodiment, the planetary gear assembly 38 has gear ratios that are configured such that the percentage of output power supplied by the CVT 14 to the output shaft 42 decreases as the transmission ratio of the CVT 14 goes from overdrive to underdrive (i.e. from minimum to maximum ratio). This is illustrated in the graph of FIG. 4, which shows that when the CVT ratio is in an overdrive condition (CVT ratio of about 0.45 to about 0.75), a greater percentage of the overall output power is provided by the CVT 14. As the CVT ratio moves towards an underdrive condition (CVT ratio of about 1.0 to about 2.3), the percentage of power from the CVT 14 decreases, such that a greater percentage of the overall output power is provided by the more efficient alternative transmission 16.

The CVT 14 is generally in an overdrive condition when the engine 12 has a relatively low engine speed and power output, and is generally in an underdrive condition when the engine 12 has a relatively high engine speed and high power output. As such, as the power output of the engine 12 increases, more of that power output is supplied to the generator 22 through the alternative transmission 16 that transmits the power more efficiently than the CVT 14. In this manner, as the load demand on the generator 22 increases, thus requiring more power from the engine 12, the CVT will move towards an underdrive condition wherein more power is passed to the generator 22 through the alternative transmission 16. Therefore, the overall efficiency of the transmission arrangement 20 increases as the power generation of the engine 12 increases.

As previously mentioned, the CVT 14 provides a less efficient power transmission path than the alternative transmission 16. As such, as the percentage of the output power that is provided by the alternative transmission 16 increases, the overall efficiency of the transmission arrangement 20 also increases.

In operation, the CVT 14 generally experiences a ratio change when the load demands on the generator 22 changes. Whenever the load demand on the generator 22 changes, the CVT 14 changes its transmission ratio to a ratio that will allow the engine 12 to operate at its most efficient rotation speed for the power that is required by the load 24. This change in transmission ratio allows the engine 12 to operate efficiently for the given power requirement, while maintaining the rotation speed that is supplied to the generator 22 substantially constant.

As mentioned above, the transmission arrangement 20 is so configured that when the load demand on the generator 22 changes, the percentage of the combined output power that is provided by the alternative transmission 16 changes. As the load demand on the generator 22 changes such that more power is required from the engine 12, the transmission arrangement 20 causes the power split between the CVT 14 and the alternative transmission 16 to be such that the overall efficiency of the transmission arrangement 20 increases.

Figure 5:
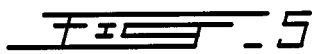
FIG. 5 shows a chart that maps the relationships between power transmission efficiency, engine rotation speed, transmission ratio of a CVT and transmission ratio of a power mixing mechanism, according to a non-limiting example.

Shown in FIG. 5 is a chart that maps the relationships between transmission efficiency 106, engine rotation speed 100, transmission ratio 102 of the CVT 14 and total transmission ratio 104. The values shown in FIG. 5 assume an input speed to the generator of 1800 rpm (60 Hz), a speed adjusting planetary ratio of 3.53 for the first gear train 80, a mixing planetary ratio of 1.63 for the second gear train 82, a transmission efficiency of 90% for the CVT 14 and first gear train 80, and a transmission efficiency of nearly 100% for the alternative transmission 16.

As the transmission ratio 102 of the CVT 14 goes from overdrive to underdrive, the transmission ratio 104 of the total transmission assembly increases. As the transmission ratio 104 of the total transmission assembly increases, the percentage of output power supplied by the alternative transmission 16 increases according to the physics of the planetary gear assembly 38. Accordingly, and as apparent from the table of FIG. 5, given that the CVT 14 is less efficient than the alternative transmission 16, as the transmission ratio 102 of the CVT 14 goes from overdrive to underdrive (such that less and less of the output power is being provided by the CVT 14) the overall efficiency 106 of the transmission arrangement 20 increases.

For example, when the transmission ratio 102 of the CVT 14 is at 0.45 (an overdrive ratio), approximately 65% of the output power is provided by the CVT 14 (based on FIG. 4), such that the transmission efficiency 106 of the transmission arrangement is at about 93.5%. However, when the transmission ratio 102 of the CVT 14 is at 1.31 (a small underdrive ratio), approximately 46% of the output power is provided by the CVT 14 (based on FIG. 4), which causes the transmission efficiency 106 of the transmission arrangement 20 to increase to 96.1%.

The power mixing mechanism 18 is configured in order to provide this power split behavior, wherein when the transmission ratio of the CVT 14 is at 0.82 or greater, a larger percentage of the output power is provided by the alternative transmission 16 than from the CVT 14. The fact that a part of the power flows through the alternative transmission 16 creates an increase in the power transmission efficiency of the transmission arrangement 20. It should be appreciated that the gear ratios and configuration of the planetary gear assembly 38 can be selected by a person of skill in the art in order to obtain any desired power split behavior.

Figure 6:
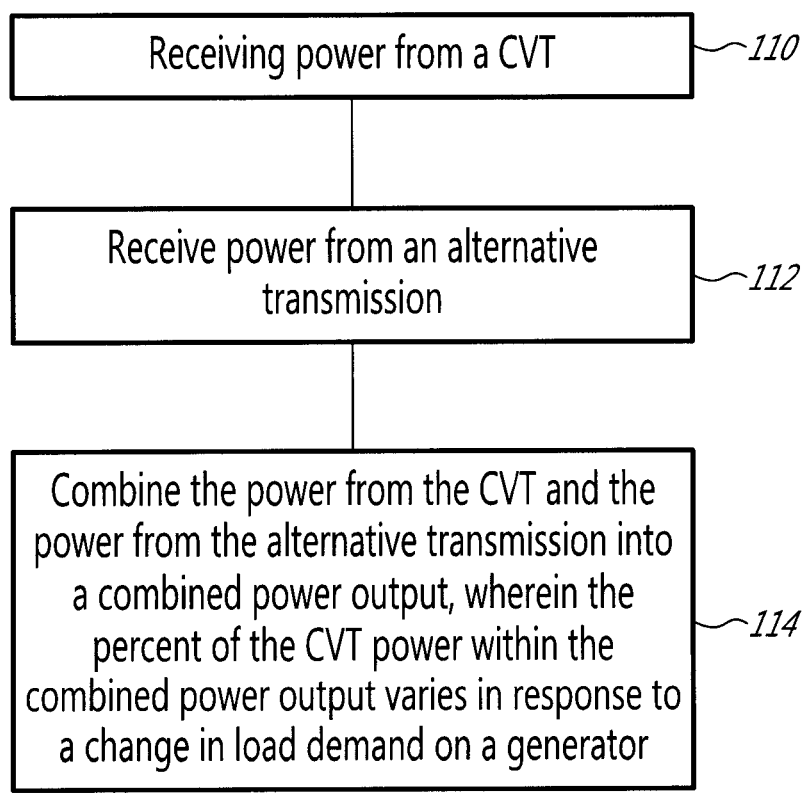
FIG. 6 shows a flow diagram of a non-limiting method of providing power from an engine to an electrical generator.

Shown in FIG. 6 is a flow diagram that summarizes the non-limiting method for transmitting power from the engine 12 to the generator 22 that has been described above.

Firstly, at steps 110 and 112, the method involves receiving, at the power mixing mechanism, power from a CVT and power from an alternative transmission. Although these steps are shown as being sequential, it should be understood that they can be performed simultaneously, or in the reverse order.

One skilled in the art will also understand that it is possible to use a different planetary 38 configuration that uses a power looping strategy to obtain similar efficiency gain in the overall transmission 20. As a non-limiting example, such a configuration could create a power loop where, at a certain CVT ratio, 150% of the power flows in the alternative transmission and −50% of the power flows in the CVT. It is thus understood that power in steps 110 or 112 can have a positive or negative value.

At step 114, the method involves combining the power from the CVT and the power from the alternative transmission into a combined power output, wherein the percentage of CVT power within the combined power output varies according to the load demand on the generator. An example of the manner in which the power mixing mechanism combines the power from the CVT and the power from the alternative transmission as well as the manner in which the percentage of power from the CVT varies has been described in detail above.

Referring back to FIG. 1, the electronic controller 28 is in communication with a clutch 32 that is positioned between the engine 12 and the CVT 14. The clutch 32 may be any suitable clutch mechanism (mechanical, hydraulic or electromagnetic) that is operative for disengaging the CVT 14 from the engine 12. When the clutch is activated, the CVT 14 is disengaged from engine 12, such that the CVT 14 does not receive any power or rotational motion from the engine 12. When the CVT 14 is disengaged, all the power and rotational motion from the engine 12 is transferred from the engine 12 to the generator 22 through the alternative transmission 16.

Of course, one skilled in the art will understand that elements of the planetary gear 38 should be acted upon to allow all the power and rotational motion from the engine 12 to be transferred from the engine 12 to the generator 22 through the alternative transmission 16. For example, the planet carrier could be blocked to prevent power to be circulated through the freewheeling sun gear 84.

As described above, the alternative transmission 16 is able to transmit power to the generator 22 more efficiently than the CVT 14. Therefore, by disengaging the CVT 14 from the engine 12, the power and rotational motion from the engine 12 can be transmitted to the generator 22 by the alternative transmission 16 with a higher efficiency.

This direct drive configuration, wherein the CVT 14 is disengaged from the engine 12, may only be useful for a portion of the generator power and speed range. As an example, the generator 22 running from 80 to 100% power can use the alternative transmission 16, which in the embodiment described above is a direct drive, in order to avoid the power losses from the CVT transmission and be able to give more power more efficiently from the engine 12 to the generator 22. However, as the power goes below 80% the CVT 14 is brought back into operation to reduce engine speed and ensure greater fuel economy for the rest of the power range.

Accordingly, in a non-limiting example of implementation, the electronic controller 28 monitors the signals from the power meter 26 that are indicative of the load demand on the generator 22. The electronic controller 28 further comprises logic and program instructions such that upon detection that the load demand on the generator 22 is within a preset range, the electronic controller is operative for activating the clutch 32, such that the CVT 14 is disengaged from the engine 12. In this manner, when the load demand on the generator 22 is in the preset range, the CVT 14 is disconnected from the engine 12 such that the transmission arrangement 20 can transmit power from the engine 12 to the generator 22 in the most efficient manner possible.

It is to be noted that in the system showed on FIG. 1 an engine flywheel 34 is of lower inertia than an output flywheel 36 since the output of the system is at constant speed while the engine speed varies. Then in the event of a sudden block load applied on the alternator the inertia energy stored in the large output flywheel 36 can be use to keep generator speed relatively constant. At the mean time the transmission system can downshift and transfer a part of this output rotational inertia energy to the engine to rapidly increase its speed. Such rapid acceleration of the engine allows it to deliver more power more rapidly in order to brought system back in steady state and reduce system response time.

It will easily be understood by one skilled in the art that the Internal combustion engine 12 could be replaced by other prime movers, such as for example, gasoline, diesel or gas fired engines, turbines and electric, pneumatic or hydraulic motors. It is to be noted that all the prime movers can be user controlled so that the rotation speed and/or output torque of the prime mover can be adjusted by the user, or by an automatic controller, depending on various parameters.

It is also to be noted that while the appended drawings and the above disclosure have been concerned with a transmission arrangement for an electric generator, other types of loads could be associated with the power output shaft, i.e. the ring gear 94 of the planetary arrangement 82 in the illustrative example shown. For example, pumps, compressors, conveyors, fans, engine accessories or turbochargers could be associated with such a transmission arrangement.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as recited in the appended claims.

What is claimed is:

1. A transmission arrangement for transmitting power from a prime mover having a controllable variable output to an output shaft associated with an input shaft of an electrical generator, the transmission arrangement comprising:
    a continuously variable transmission (CVT) so configured as to receive power from the variable output of the prime mover and to provide a CVT power output; the CVT having a variable transmission ratio;
    an alternative transmission so configured as to receive power from the variable output of the prime mover and to provide an alternative transmission power output; and
    a power mixing mechanism so configured as to combine the CVT power output and the alternative transmission power output into a combined power output to be supplied to the output shaft;
    an electronic controller so configured as to adjust the transmission ratio of the CVT in response to a change in a load demand at the electrical generator; the adjustment of the transmission ratio of the CVT causes an adjustment in the percentage of CVT power within the combined power output;
    wherein a percentage of CVT power within the combined power output decreases as power supplied by the prime mover increases.

2. A transmission arrangement as recited in claim 1, wherein the prime mover is an internal combustion engine.

3. A transmission arrangement as recited in claim 1, wherein the percentage of CVT power within the combined power output decreases as the transmission ratio of the CVT moves from overdrive towards underdrive.

4. A transmission arrangement as recited in claim 3, wherein the percentage of CVT power within the combined power output is less than a percentage of alternative transmission power within the combined power output when the CVT is in an underdrive transmission ratio.

5. A transmission arrangement as recited in claim 1, further comprising a power meter associated with the generator and so configured as to supply load demand data to the electronic controller.

6. A transmission arrangement as recited in claim 1, wherein the electronic controller is further configured to control the prime mover in order to vary a speed and/or power of the prime mover.

7. A transmission arrangement as recited in claim 1, further comprising a first speed sensor so configured as to supply combined output speed data to the electronic controller.

8. A transmission arrangement as recited in claim 7, further comprising a second speed sensor so configured as to supply prime mover speed data to the electronic controller.

9. A transmission arrangement as recited in claim 1, further comprising a low inertia flywheel associated with a rotating output shaft of the prime mover.

10. A transmission arrangement as recited in claim 9, further comprising a high inertia flywheel associated with a rotating input shaft of the electrical generator.

11. A transmission arrangement as recited in claim 1, wherein the alternative transmission comprises an input shaft of the CVT.

12. A transmission arrangement for transmitting power from a prime mover having a controllable variable output to an output shaft, the transmission arrangement comprising:
    a continuously variable transmission (CVT) so configured as to receive power from the variable output of the prime mover and to provide a CVT power output; the CVT having a variable transmission ratio;
    an alternative transmission so configured as to receive power from the variable output of the prime mover and to provide an alternative transmission power output; and
    a power mixing mechanism so configured as to combine the CVT power output and the alternative transmission power output into a combined power output to be supplied to the output shaft, the power mixing mechanism comprising a planetary gear assembly that comprises:
        a first planetary arrangement having a first sun gear, a first set of planet gears and a fixed ring gear;
        a second planetary arrangement having a second sun gear, a second set of planet gears and a ring gear in communication with the output shaft for providing the combined output power to a load,
    wherein, the CVT power output is supplied to the first sun gear and the alternative transmission power output is supplied to the second sun gear; and
    wherein a percentage of CVT power within the combined power output decreases as power supplied by the prime mover increases.

13. A transmission arrangement as recited in claim 12, wherein the first and second sets of planet gears are interconnected via respective planet carriers.

14. A transmission arrangement as recited in claim 12, wherein the first planetary arrangement, the second planetary arrangement and the output shaft are co-axial.

15. A transmission arrangement as recited in claim 12, wherein the second planetary arrangement has a mixing ratio of 1.63.

16. A transmission arrangement as recited in claim 15, wherein the first planetary arrangement has a mixing ratio of 3.53.

17. A transmission arrangement as recited in claim 1, wherein the CVT is a toroidal CVT.

18. A method for providing power from a prime mover having a controllable variable output to an output shaft associated with an input shaft of an electrical generator, the method comprising:
    receiving at a power mixing mechanism, a continuously variable transmission (CVT) power output;
    receiving at the power mixing mechanism, an alternative transmission power output;
    combining, at the power mixing mechanism, the CVT power output and the alternative transmission power output into a combined power output to be provided to the output shaft;
    adjusting a transmission ratio of a CVT supplying the CVT power output in response to a load demand at the electrical generator, the adjustment of the transmission ratio of the CVT causing an adjustment in the percentage of CVT power within the combined power output;
    wherein a percentage of CVT power within the combined power output varies in response to a change in load demand at the output shaft.

19. A method as recited in claim 18, wherein the output shaft is associated with an electric power generator.

* * * * *